United States Patent
Sakuda et al.

(10) Patent No.: US 10,053,134 B2
(45) Date of Patent: Aug. 21, 2018

(54) STEERING SYSTEM

(71) Applicants: JTEKT CORPORATION, Osaka-shi, Osaka (JP); TOYOTA JIDOSHA KABUSHIKI KAISHA, Toyota-shi, Aichi-ken (JP)

(72) Inventors: Masayoshi Sakuda, Kashihara (JP); Tomonori Sugiura, Yamatokoriyama (JP); Yuji Takahashi, Obu (JP); Tatsuro Kubota, Shiki-gun (JP); Shoji Ishimura, Kashihara (JP); Shigeru Hoshino, Toyota (JP)

(73) Assignees: JTEKT CORPORATION, Osaka-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/426,263

(22) Filed: Feb. 7, 2017

(65) Prior Publication Data
US 2017/0232994 A1    Aug. 17, 2017

(30) Foreign Application Priority Data
Feb. 12, 2016 (JP) .................. 2016-024884

(51) Int. Cl.
*B62D 1/19* (2006.01)
*B62D 1/184* (2006.01)
(Continued)

(52) U.S. Cl.
CPC ............. *B62D 1/184* (2013.01); *B62D 1/185* (2013.01); *B62D 1/189* (2013.01); *B62D 1/195* (2013.01)

(58) Field of Classification Search
CPC ........ B62D 1/184; B62D 1/185; B62D 1/189; B62D 1/195
See application file for complete search history.

(56) References Cited

U.S. PATENT DOCUMENTS 6,267,347 B1    7/2001 Ryan et al.
2009/0243172 A1    10/2009 Ting et al.
(Continued)

FOREIGN PATENT DOCUMENTS

DE    102014200933 A1    8/2014
EP    2923922 A2    9/2015
(Continued)

OTHER PUBLICATIONS

Oct. 13, 2017 Extended European Search Report issued in European Patent Application No. 17155276.3.

*Primary Examiner* — James A English
(74) *Attorney, Agent, or Firm* — Oliff PLC

(57) ABSTRACT

A steering system includes a column jacket including a lower jacket and an upper jacket; an engagement member; a retaining member; and a buffer member that is retained by the retaining member and contacts the engagement member in a contact direction at a time when the upper jacket is displaced to one sliding end. The retaining member includes a support surface that supports the buffer member; paired holding portions that are respectively disposed on both sides of the buffer member in a circumferential direction of the upper jacket and hold the buffer member toward the support surface; and a restriction portion configured to be engaged with an end of the buffer member on a side toward which an opposite direction is directed, so as to restrict movement of the buffer member in the opposite direction, the opposite direction being opposite to the contact direction.

5 Claims, 9 Drawing Sheets

(51) Int. Cl.
*B62D 1/185* (2006.01)
*B62D 1/189* (2006.01)

(56) References Cited

U.S. PATENT DOCUMENTS

2010/0242662 A1    9/2010  Hirooka et al.
2012/0085194 A1    4/2012  Inoue
2014/0026707 A1    1/2014  Yokota et al.

FOREIGN PATENT DOCUMENTS

| GB | 717776 A | | 11/1954 | |
|---|---|---|---|---|
| GB | 751612 A | | 7/1956 | |
| GB | 2510822 A | * | 8/2014 | ............. B62D 1/185 |
| JP | 2014-024493 A | | 2/2014 | |

* cited by examiner

STEERING SYSTEM

INCORPORATION BY REFERENCE

The disclosure of Japanese Patent Application No. 2016-024884 filed on Feb. 12, 2016 including the specification, drawings and abstract is incorporated herein by reference in its entirety.

BACKGROUND

1. Technical Field

The disclosure relates to a steering system.

2. Description of Related Art

In a steering system, a buffer material is attached to one of a bolt shaft of a fastener that achieves telescopic lock and a stopper plate that faces the bolt shaft in an axial direction of a column pipe. When the buffer material contacts the other of the bolt shaft and the stopper plate during telescopic adjustment, an adjustment range of the telescopic adjustment is restricted. Such a steering system is proposed (for example, see Japanese Patent Application Publication No. 2014-24493 (JP 2014-24493 A)).

SUMMARY

In the case where a large shock is generated at a time when the buffer material contacts the other of the bolt shaft and the stopper plate, the buffer material may be detached from the one of the bolt shaft and the stopper plate and thus cannot stably absorb the shock in the steering system described in JP 2014-24493 A.

The disclosure provides a steering system in which a buffer member is unlikely to be detached and can stably absorb a shock at a time of contact.

A first aspect of the disclosure relates to a steering system including a column jacket that includes a lower jacket, and an upper jacket having a tubular shape, the upper jacket being fitted into the lower jacket so as to be slidable with respect to the lower jacket in a column axis direction within a specified sliding range during telescopic adjustment, and the upper jacket moving integrally with a steering member in the column axis direction; an engagement member that is supported by the lower jacket; a retaining member that is fixed to an outer periphery of the upper jacket and moves integrally with the upper jacket during the telescopic adjustment; and a buffer member that is retained by the retaining member so as to face the engagement member in the column axis direction and contacts the engagement member in a contact direction at a time when the upper jacket is displaced to one sliding end of the specified sliding range. The retaining member includes a support surface that extends in the column axis direction, faces outward in a radial direction of the upper jacket, and supports the buffer member in the radial direction; paired holding portions that are respectively disposed on both sides of the buffer member in a circumferential direction of the upper jacket and hold the buffer member toward the support surface; and a restriction portion configured to be engaged with an end of the buffer member on a side toward which an opposite direction is directed, so as to restrict movement of the buffer member in the opposite direction, the opposite direction being opposite to the contact direction.

In the above aspect, the paired holding portions of the retaining member hold the buffer member toward the support surface. Accordingly, when the buffer member contacts the engagement member during the telescopic adjustment, the buffer member is unlikely to be detached from the retaining member and thus can stably absorb a shock at the time of contact.

In the above aspect, the restriction portion may include an inclined surface that is inclined toward a side toward which the contact direction is directed as the inclined surface extends outward in the radial direction.

In the above configuration, when the buffer member contacts the engagement member, separation of the buffer member from the support surface is suppressed by the inclined surface of the restriction portion of the retaining member. Thus, the buffer member is further unlikely to be detached from the retaining member.

In the above aspect, the buffer member may include a supported surface that is supported by the support surface; and the supported surface may include a protrusion that contacts the support surface and forms a space between the supported surface and the support surface.

In the above configuration, when the buffer member contacts the engagement member, along with compressed deformation of the buffer member in the column axis direction, the supported surface of the buffer member is deformed and expanded such that a portion thereof is protruded in the space on the side of the support surface. Thus, deformation of the buffer member in a direction in which the buffer member separates from the support surface is suppressed. Thus, the buffer member is further unlikely to be detached from the retaining member.

In the above aspect, the buffer member may include a first surface that is a supported surface supported by the support surface, a second surface that is disposed on a side opposite to the first surface in the radial direction, and a rib that is formed on the second surface and extends in the column axis direction.

In the above configuration, the buffer member has high rigidity against bending toward the second surface-side that is a side opposite to the support surface. Accordingly, when the buffer member contacts the engagement member and is compressed in the column axis direction, bending deformation of the buffer member toward the second surface-side is suppressed. Thus, the buffer member is further unlikely to be detached from the retaining member.

In the above aspect, the steering system may include a restriction member that is supported by the lower jacket; and when the buffer member contacts the engagement member, the restriction member may be disposed on an opposite side of the buffer member from the support surface so as to restrict separation of the buffer member from the support surface.

In the above configuration, the separation of the buffer member from the support surface is suppressed by the restriction member that is supported by the lower jacket. Thus, the buffer member is further unlikely to be detached from the retaining member.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
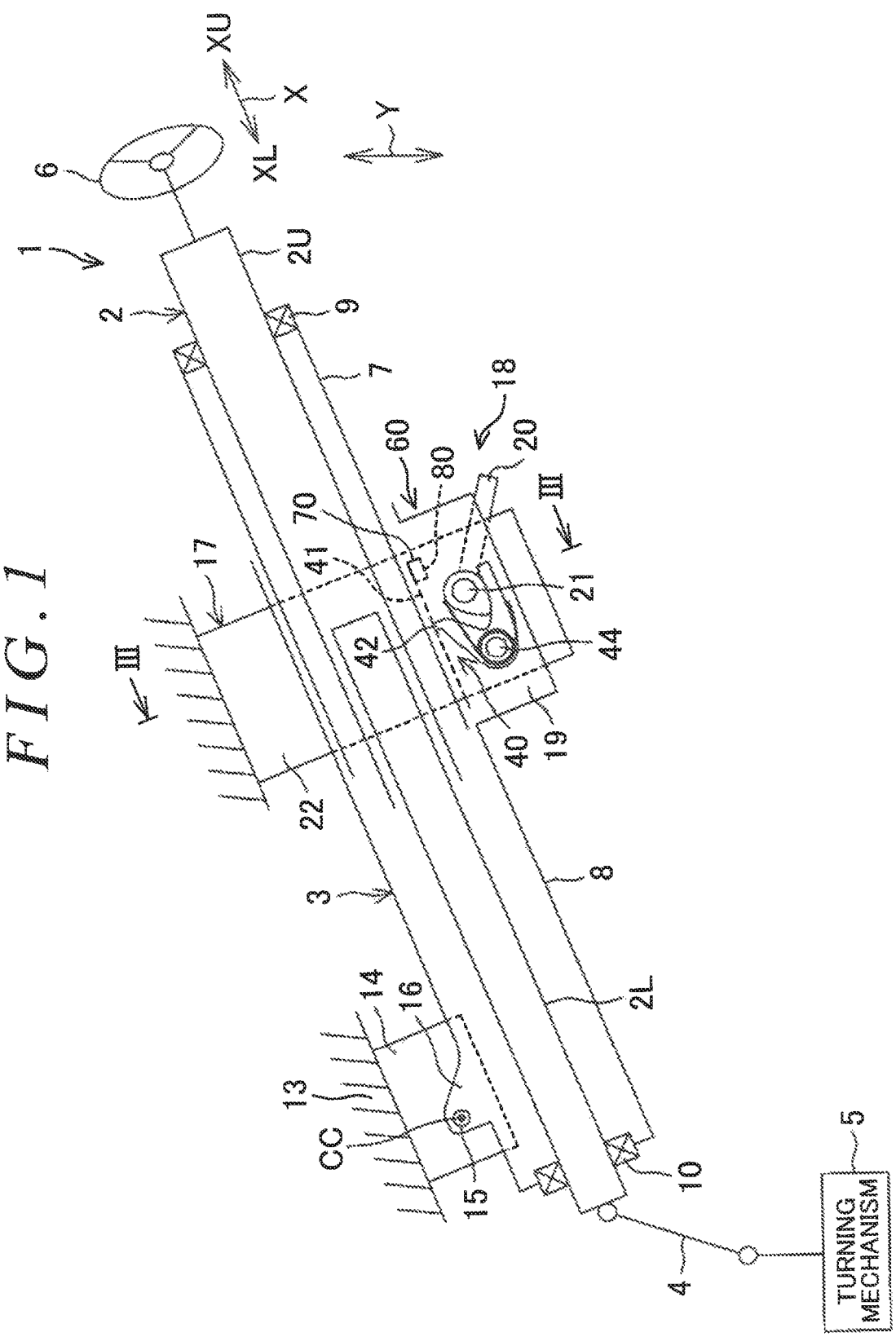
FIG. 1 is a partially-fractured schematic side view of a steering system according to one embodiment of the disclosure.

A description will hereinafter be made on an embodiment of the disclosure in accordance with the drawings. FIG. 1 is a partially-fractured schematic side view that shows a schematic configuration of a steering system according to a first embodiment of the disclosure. With reference to FIG. 1, a steering system 1 includes a steering shaft 2, a column jacket 3, an intermediate shaft 4, and a turning mechanism 5. Hereinafter, an upper side in a column axis direction X as an axial direction of the steering shaft 2 will be referred to as an axially upper side XU, and a lower side in the column axis direction X will be referred to as an axially lower side XL.

A steering member 6 such as a steering wheel is coupled to an end in the axially upper side XU of the steering shaft 2. The steering system 1 turns steered wheels (not shown) in accordance with steering of the steering member 6. The turning mechanism 5 is a rack and pinion mechanism, for example, but is not limited thereto. The steering shaft 2 includes a tubular upper shaft 2U and a lower shaft 2L. The upper shaft 2U and the lower shaft 2L are fitted to each other by spline fitting or serration fitting, for example, such that the upper shaft 2U and the lower shaft 2L slide relative to each other in the column axis direction X. The steering member 6 is coupled to the end in the axially upper side XU of the upper shaft 2U.

The column jacket 3 includes a lower jacket 8 as an outer jacket and an upper jacket 7 having a tubular shape as an inner jacket that is fitted into the lower jacket 8. The column axis direction X is also an axial direction of the upper jacket 7 and an axial direction of the lower jacket 8. The steering shaft 2 is inserted through the column jacket 3. The upper shaft 2U is rotatably supported by the upper jacket 7 via a bearing 9, and the lower shaft 2L is rotatably supported by the lower jacket 8 via a bearing 10.

When the upper shaft 2U slides in the column axis direction X with respect to the lower shaft 2L, the column jacket 3 can be extended and contracted together with the steering shaft in the column axis direction X. By extending and contracting the steering shaft 2 and the column jacket 3 in the column axis direction X, a position of the steering member 6 can be adjusted in a longitudinal direction of a vehicle. Thus, the steering system 1 has a telescopic adjustment function.

During telescopic adjustment, the upper jacket 7 can slide within a specified sliding range (corresponding to a telescopic adjustment range) in the column axis direction X with respect to the lower jacket 8. When the upper jacket 7 is located at a lower limit sliding position as an end position of the sliding range, the column jacket is in the most contracted state. When the upper jacket 7 is located at an upper limit sliding position as the other end position of the sliding range, the column jacket 3 is in the most extended state. The lower limit sliding position will also be referred to as a telescopic short position, and the upper limit sliding position will also be referred to as a telescopic long position.

The steering system 1 includes: a fixed bracket 14 that is fixed to a vehicle body 13; a tilt center shaft 15 that is supported by the fixed bracket 14; and a column bracket 16 that is fixed to an outer periphery of the lower jacket 8 and is rotatably supported by the tilt center shaft 15. The steering shaft 2 and the column jacket 3 can rotate in an up-down direction Y with a tilt center CC as a center axis of the tilt center shaft 15 serving as a fulcrum.

When the steering shaft 2 and the column jacket 3 rotate about the tilt center CC, a position of the steering member 6 can be adjusted in the up-down direction Y (a height direction). Thus, the steering system 1 has a tilt adjusting function. The steering system 1 includes: a bracket 17 that is fixed to the vehicle body 13; and a fastening mechanism 18 that locks the position after tilt adjustment and the telescopic adjustment. The fastening mechanism 18 achieves locking by fastening paired fastened portions 19 via the bracket 17. The fastened portions 19 are integrally provided in an upper portion of the lower jacket 8 in the column axis direction X.

Figure 2:
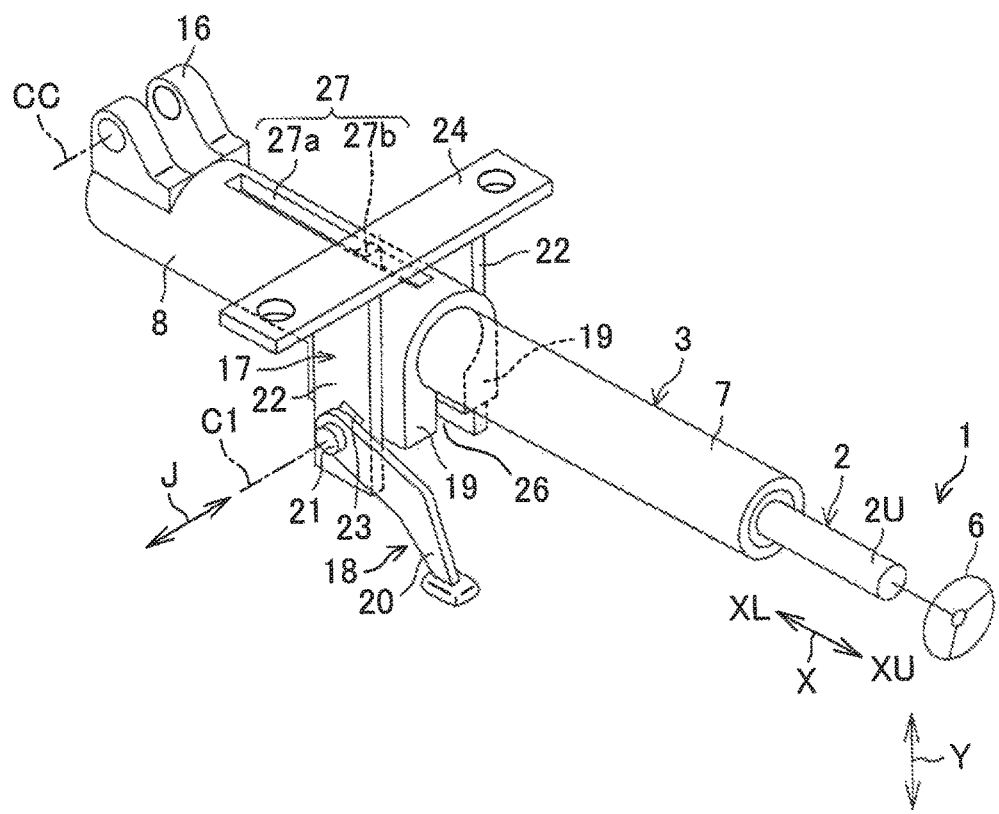
FIG. 2 is a schematic perspective view of the steering system.
Figure 3:
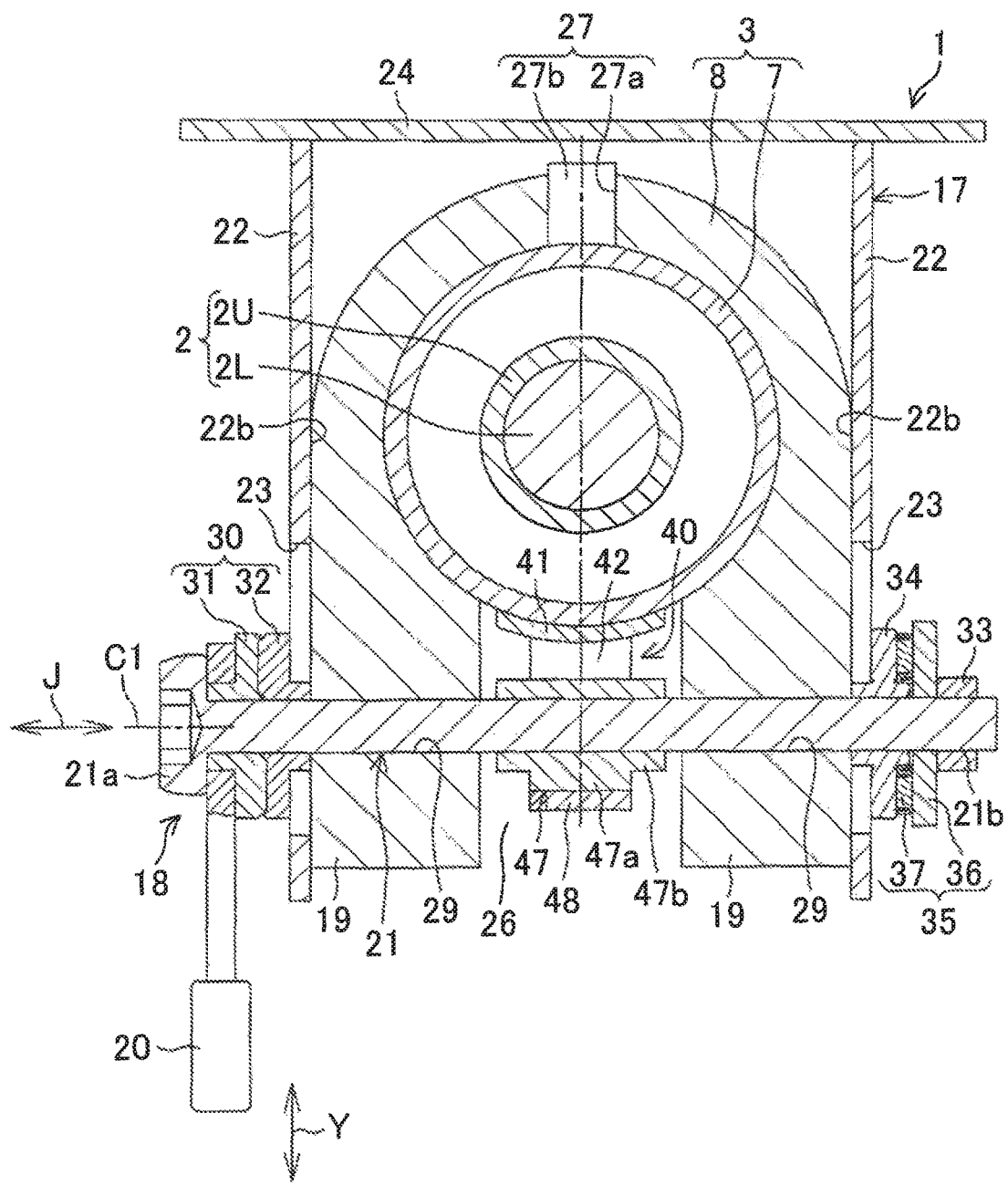
FIG. 3 is a sectional view of a main portion of the steering system and corresponds to a sectional view that is taken along line III-III in FIG. 1.

FIG. 2 is a schematic perspective view of the steering system 1. As shown in FIG. 2, the lower jacket 8 includes a slit 26 that extends from an upper end thereof in the column axis direction X toward the axially lower side XL thereof. The paired fastened portions 19 are respectively disposed on both sides of the slit 26. A diameter of the lower jacket 8 can be elastically reduced by fastening the paired fastened portions 19. FIG. 3 is a schematic sectional view of the steering system 1 and corresponds to a sectional view that is cut along line III-III in FIG. 1.

As shown in FIG. 3, the bracket 17 includes: an attachment plate 24 that is attached to the vehicle body 13; and paired side plates 22 that respectively extend below in the up-down direction Y from both ends of the attachment plate 24. A long tilt hole 23 that extends in the up-dawn direction Y is formed in each of the side plates 22. The paired fastened portions 19 of the lower jacket 8 are disposed between the paired side plates 22 and each have a plate shape that extends along an inner surface 22b of the corresponding side plate 22. An insertion hole 29 as a circular hole is formed in each of the fastened portions 19.

The steering system 1 includes an upper limit sliding position restriction mechanism 27 that restricts (defines) the upper limit sliding position of the upper jacket 7 during the telescopic adjustment. The upper limit sliding position restriction mechanism 27 includes: a guide groove 27a that is formed in the lower jacket 8 and extends in the column axis direction X; and a guided protrusion 27b that is fixed to the upper jacket 7 and is fitted to the guide groove 27a. The guide groove 27a restricts rotation of the upper jacket 7 via the guided protrusion 27b.

In addition, an end (not shown) in the axially upper side XU of the guide groove 27a contacts the guided protrusion 27b during the telescopic adjustment. In this way, movement of the upper jacket 7 is restricted at the upper limit sliding position (the telescopic long position) of the sliding range. Thus, removal of the upper jacket 7 from the lower jacket 8 is also prevented. As shown in FIG. 1 and FIG. 2, the fastening mechanism 18 includes: an operation lever 20 as an operation member that is rotationally operated by a driver; and a fastening shaft 21 that is integrally rotatable with the operation lever 20. A center axis C1 of the fastening shaft 21 corresponds to rotation center of the operation lever 20.

The fastening shaft 21 is a bolt and is inserted through the long tilt holes 23 of both of the side plates 22 of the bracket 17 and the insertion holes 29 of both of the fastened portions 19 of the lower jacket 8. The fastening shaft 21 and the lower jacket 8 integrally move in the up-down direction Y with respect to the bracket 17 during the tilt adjustment. As shown in FIG. 3, a head 21a that is provided at an end of the fastening shaft 21 is fixed to the operation lever 20 so as to be rotatable integrally with the operation lever 20. The fastening mechanism 18 further includes a force conversion mechanism 30 that is interposed between the head 21a of the fastening shaft 21 and one of the side plates 22 (the side plate 22 on a left side in FIG. 3), and converts operation torque of the operation lever 20 to an axial force of the fastening shaft 21 (a fastening force for fastening the paired side plates 22).

The force conversion mechanism 30 includes: a rotary cam 31 that is coupled to the operation lever 20 so as to be rotatable integrally with the operation lever 20 and whose movement in a fastening shaft direction J with respect to the fastening shaft 21 is restricted; and one fastening member 32 that is engaged with the rotary cam 31 and fastens the one side plate 22. The one fastening member 32 is a non-rotary cam whose rotation is restricted. The fastening mechanism 18 further includes: a nut 33 that is screwed to a screw 21b provided at the other end of the fastening shaft 21; another fastening member 34 that fastens the other side plate 22 (the side plate 22 on a right side in FIG. 3); and an interposition member 35 that is interposed between the other fastening member 34 and the nut 33. The interposition member 35 includes a washer 36 and a needle roller bearing 37.

The rotary cam 31, the one fastening member 32, and the other fastening member 34 are supported on an outer periphery of the fastening shaft 21. Rotation of each of the one fastening member 32 and the other fastening member 34 is restricted by engagement with the corresponding long tilt hole 23. When the rotary cam 31 rotates with respect to the one fastening member 32 along with rotation of the operation lever 20 in a locking direction, the fastening member 32 moves along the fastening shaft direction J in a direction in which the fastening member 32 moves away from the rotary cam 31. In this way, the paired side plates 22 of the bracket 17 are clamped and fastened by both of the fastening members 32, 34.

At this time, each of the side plates 22 of the bracket 17 fastens the corresponding fastened portion 19 of the lower jacket 8. In this way, movement of the lower jacket 8 in the up-down direction Y is restricted, and tilt lock is achieved. In addition, when both of the fastened portions 19 are fastened, the diameter of the lower jacket 8 is elastically reduced, and the lower jacket 8 thereby fastens the upper jacket 7. As a result, movement of the upper jacket 7 in the column axis direction X is restricted, and telescopic lock is achieved.

Figure 4:
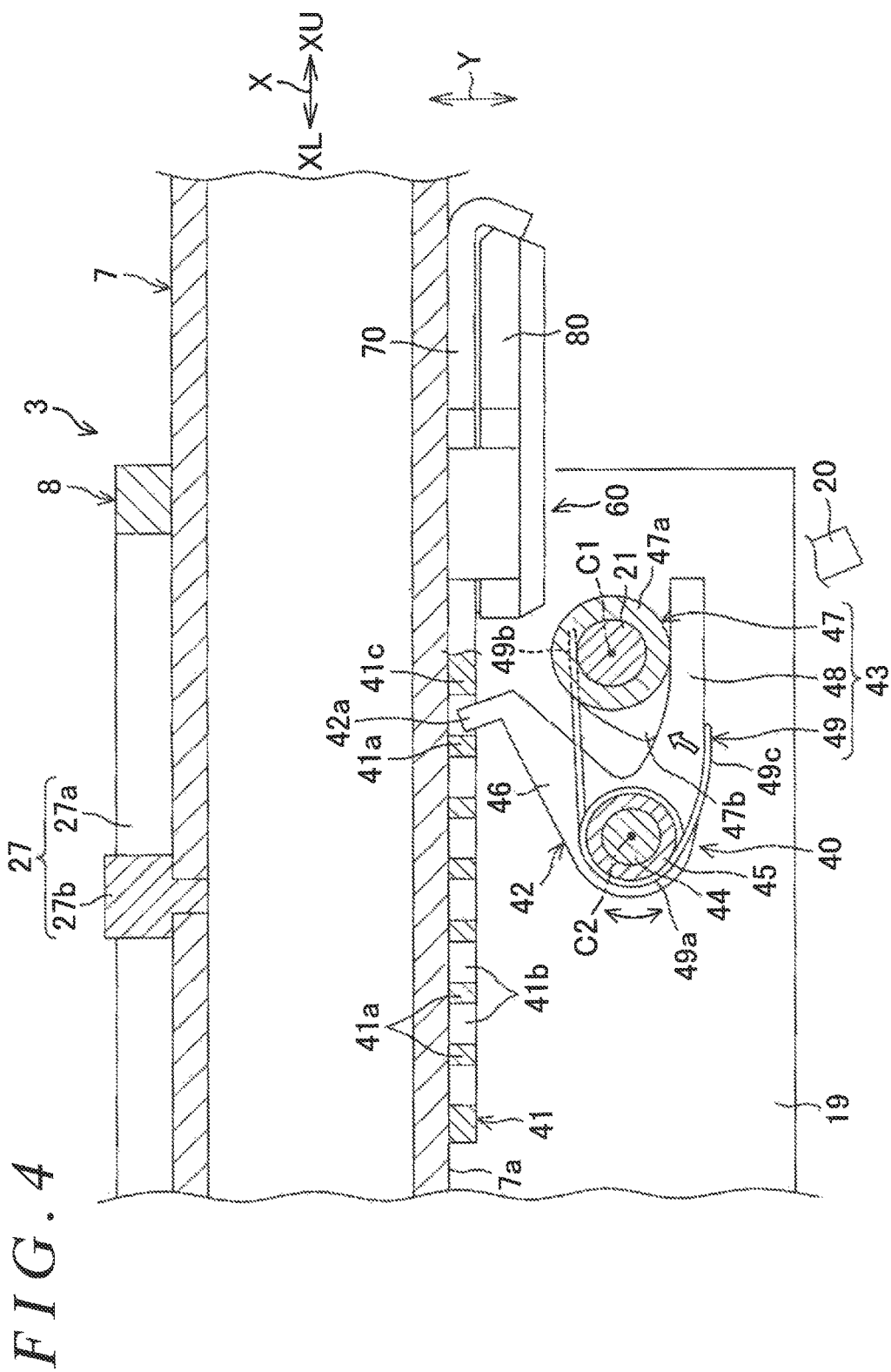
FIG. 4 is a sectional view of the main portion of the steering system and shows a locked state of a tooth lock mechanism.

On the other hand, when the operation lever 20 rotates in an unlocking direction, the fastening member 32 moves along the fastening shaft direction J in a direction in which the fastening member 32 approaches the rotary cam 31, along with rotation of the rotary cam 31. In this way, fastening of the paired side plates 22 by both of the fastening members 32, 34 is canceled, and the tilt adjustment and the telescopic adjustment can be made. FIG. 4 is a sectional view of a main portion of the steering system 1. As shown in FIG. 1 and FIG. 4, the steering system 1 includes a tooth lock mechanism 40 in order to stabilize initial restriction thereof in a telescopic direction during a secondary collision of a vehicle collision. The tooth lock mechanism 40 has such a configuration that teeth thereof mesh each other, and thereby retains the telescopic position of the upper jacket 7.

The tooth lock mechanism 40 includes: a first tooth member 41 that is fixed to an outer periphery 7a of the upper jacket 7; a second tooth member 42 that is rotatably supported by the lower jacket 8; and an interlocking mechanism 43 that causes the second tooth member 42 to rotate in accordance with the rotation of the fastening shaft 21. The first tooth member 41 includes a plurality of first teeth 41a that are arranged at specified intervals in the column axis direction X. A plurality of grooves 41b may be formed at specified intervals so as to extend through a long plate, for example, and each of the plurality of first teeth 41a of the first tooth member 41 may be formed between two of the adjacent grooves 41b.

The second tooth member 42 is rotatably supported by the paired fastened portions 19 of the lower jacket 8 via a support shaft 44. The second tooth member 42 includes a second tooth 42a that is engaged with/disengaged from the first tooth 41a along with rotation of the second tooth member 42 about the support shaft 44. Although not shown, both ends of the support shaft 44 in an axial direction are respectively supported by the paired fastened portions 19, and the second tooth member 42 is supported by the upper jacket 7 at an intermediate portion of the support shaft 44 in the axial direction.

The second tooth member 42 includes: a boss 45 that surrounds an outer periphery of the support shaft 44; and a first arm 46 that extends so as to be protruded from an outer periphery of the boss 45. The second tooth 42a is formed at an extended end of the first arm 46. The support shaft 44 includes a fracture target portion (not shown) that is to be fractured by a shock during the secondary collision generated in a locked state where the first tooth 41a and the second tooth 42a mesh each other. Accordingly, a shock absorption load is generated by fracture of the fracture target portion during the secondary collision. In addition, due to the fracture, movement of the upper jacket 7 to the axially lower side XL (shock absorption movement) is allowed.

The interlocking mechanism 43 includes: a cam member 47 that is coupled to the fastening shaft 21 so as to be rotatable integrally with the fastening shaft 21; a second arm 48 as a cam follower member that is rotatable integrally with the second tooth member 42 and follows the cam member 47 (i.e., moves in accordance with the cam member 47); and an urging member 49 that rotationally urges the second tooth member 42 in a direction in which the second tooth 42a meshes with the first tooth 41a, via the second arm 48. The cam member 47 includes: a boss 47a that is fitted to the outer periphery of the fastening shaft 21 so as to be rotatable integrally with the fastening shaft 21; and a cam protrusion 47b that is protruded radially outward from the boss 47a.

The urging member 49 is formed of a torsion spring, for example. More specifically, the urging member 49 includes: a coil portion 49a that surrounds the boss 45 of the second tooth member 42; a first engagement portion 49b that extends from the coil portion 49a and is engaged with the outer periphery of the fastening shaft 21; and a second engagement portion 49c that is engaged with the second arm 48 as the cam follower member. The urging member 49 rotationally urges the second tooth member 42 counterclockwise in FIG. 4 (indicated by a blank arrow in FIG. 4).

Figure 5:
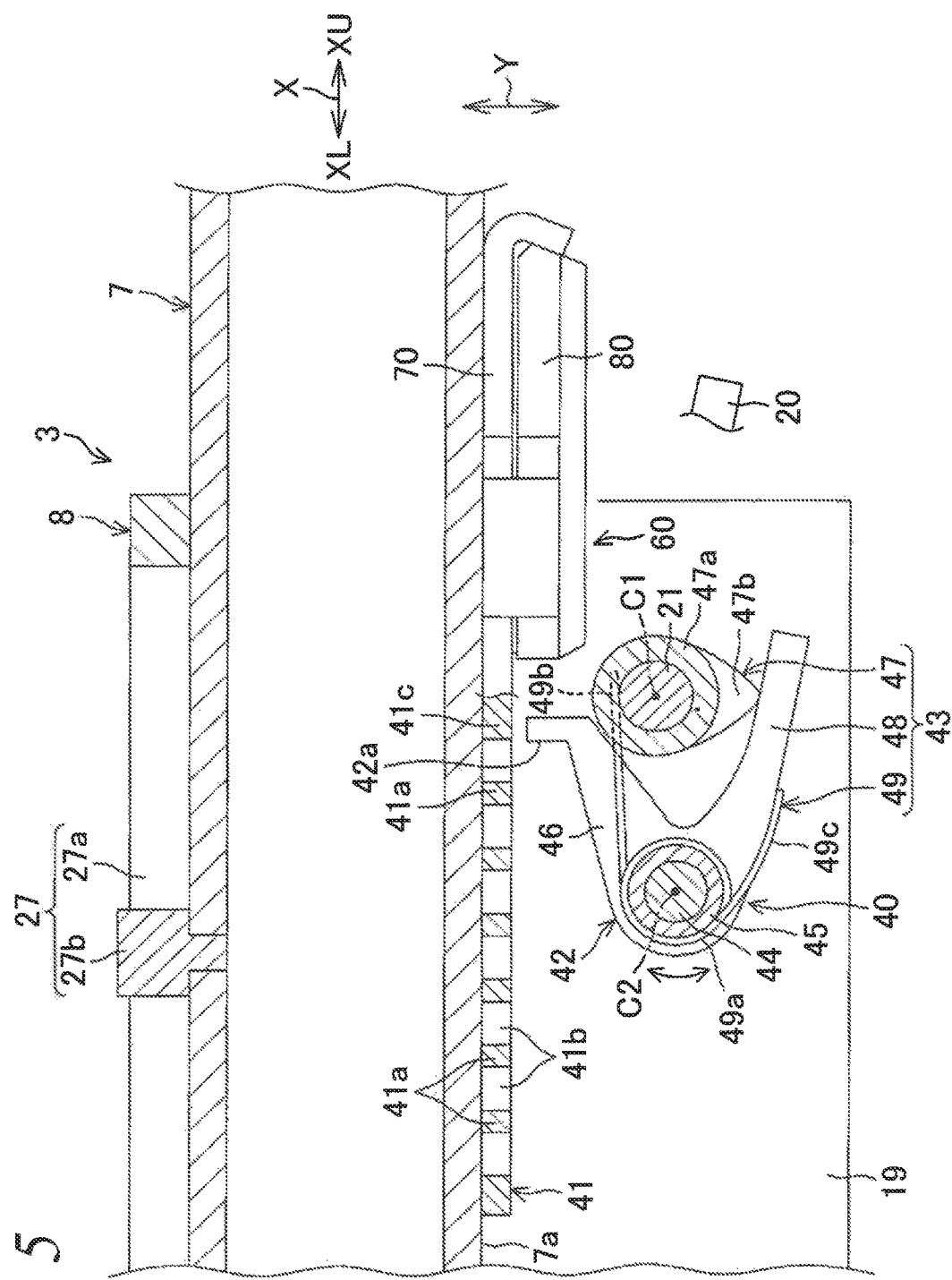
FIG. 5 is a sectional view of the main portion of the steering system and shows an unlocked state of the tooth lock mechanism.

When the operation lever 20 and the fastening shaft 21 rotate about the center axis C1 of the fastening shaft 21 in the locking direction (clockwise in FIG. 5) from an unlocked state shown in FIG. 5, the cam protrusion 47b allows counterclockwise rotation of the second arm 48 about a center axis C2 of the support shaft 44. Accordingly, with an action of the urging member 49, the second tooth member 42 rotates counterclockwise, and the second tooth 42a meshes with the first tooth 41a as shown in FIG. 4. In this way, tooth lock is achieved.

When the operation lever 20 rotates in the unlocking direction (counterclockwise in FIG. 4) from the locked state shown in FIG. 4, as shown in FIG. 5, the cam protrusion 47b causes the second tooth member 42 to rotate clockwise about the center axis C2 via the second arm 48 against the urging member 49. Accordingly, meshing of the second tooth 42a with the first tooth 41a is cancelled, and the tooth lock is thereby cancelled.

Figure 6:
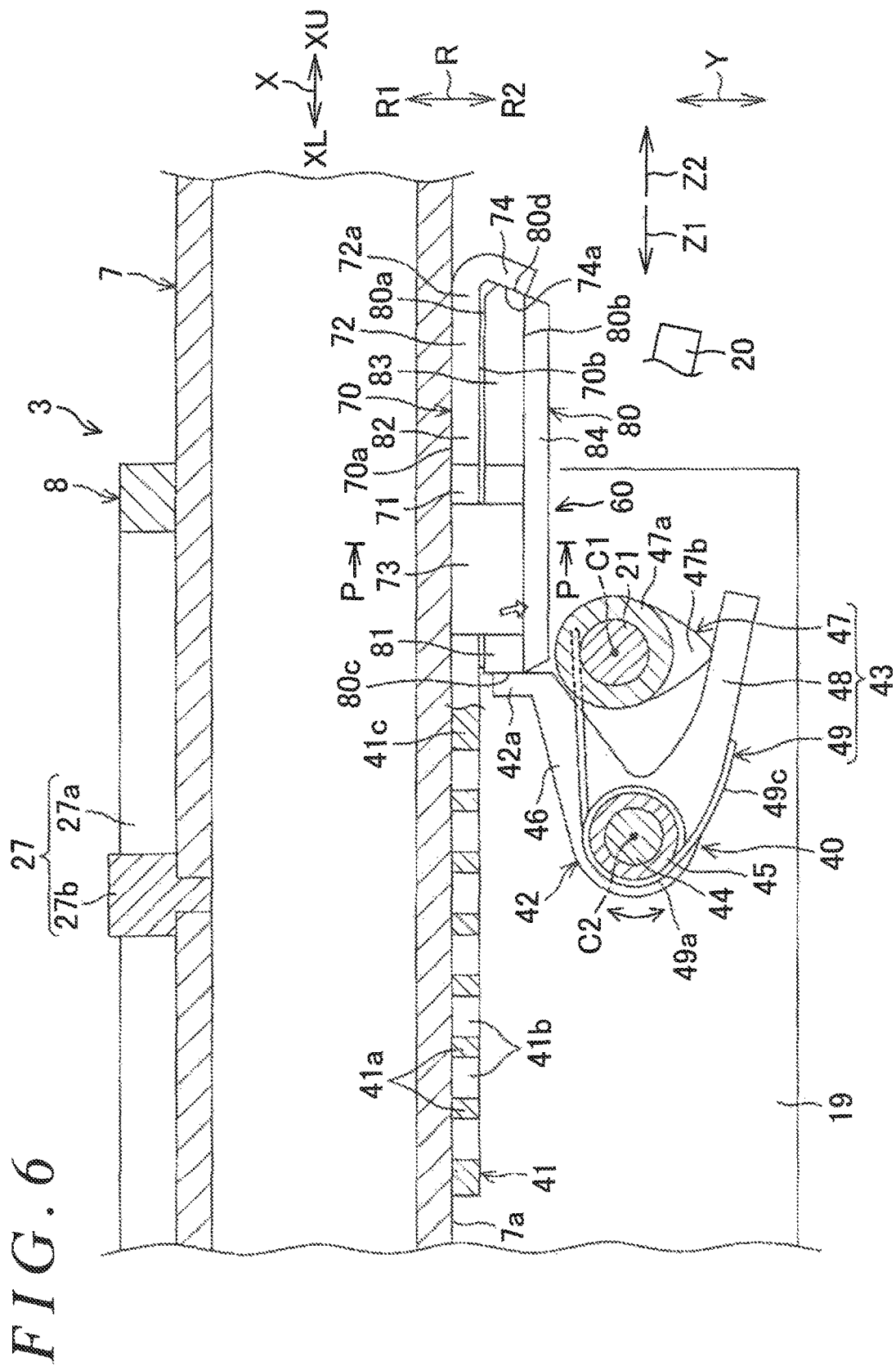
FIG. 6 is a sectional view of the main portion of the steering system and shows a state where an upper jacket is displaced to a lower limit sliding position as an end position of a sliding range during telescopic adjustment.

FIG. 6 is a sectional view of the main portion of the steering system 1 and shows a state where the upper jacket 7 is displaced to the lower limit sliding position as the end position of the sliding range during the telescopic adjustment. As shown in FIG. 6, the steering system 1 includes a lower limit sliding position restriction mechanism 60 that restricts (defines) the lower limit sliding position (the telescopic short position) of the upper jacket 7. The lower limit sliding position restriction mechanism 60 includes: the second tooth member 42 as an engagement member that is supported by the lower jacket 8; and a buffer member 80 that is retained by a retaining member 70 that moves integrally with the upper jacket 7 in the column axis direction X.

Figure 7:
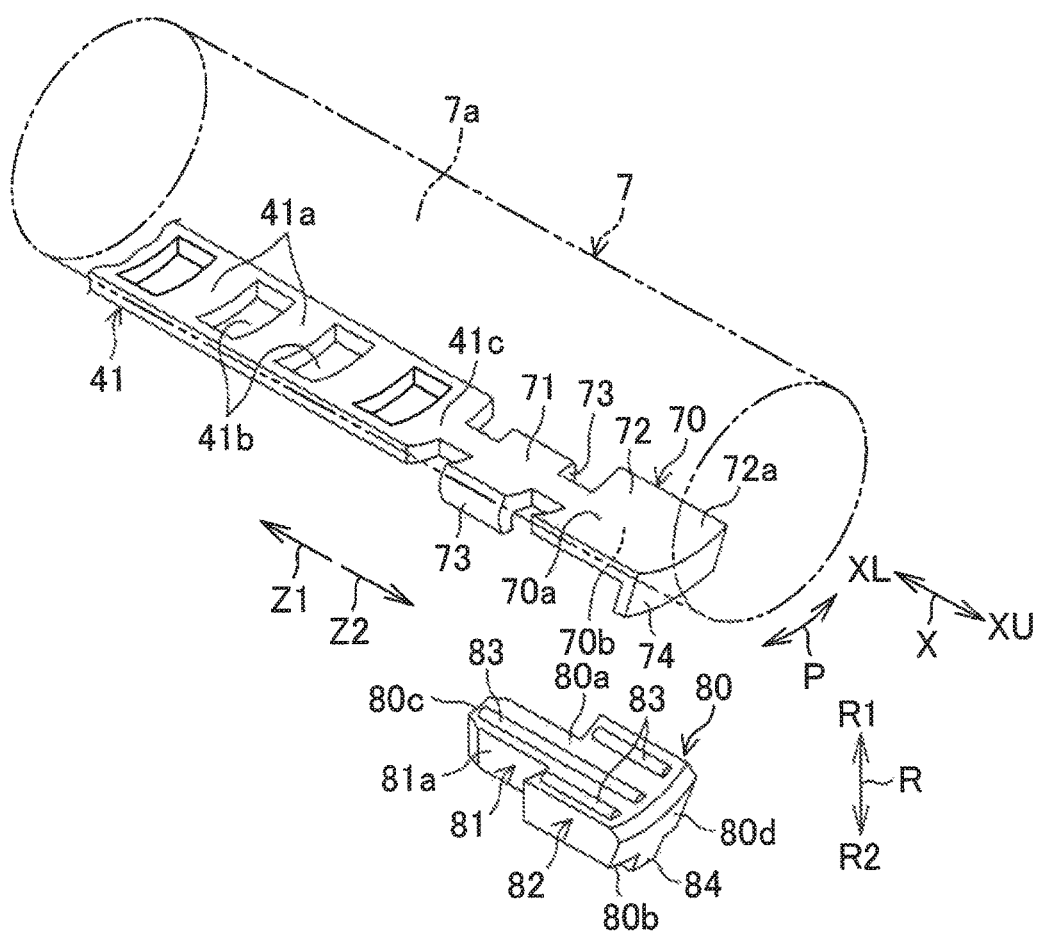
FIG. 7 is an exploded perspective view of a lower limit sliding position restriction mechanism that restricts the lower limit sliding position of the upper jacket.
Figure 8:
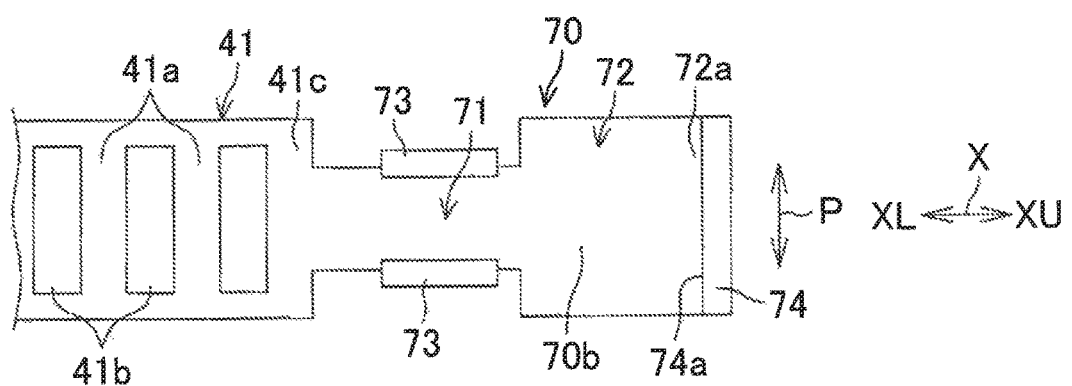
FIG. 8 is a bottom view of a retaining member that is integrally provided with a first tooth member.
Figure 9A:
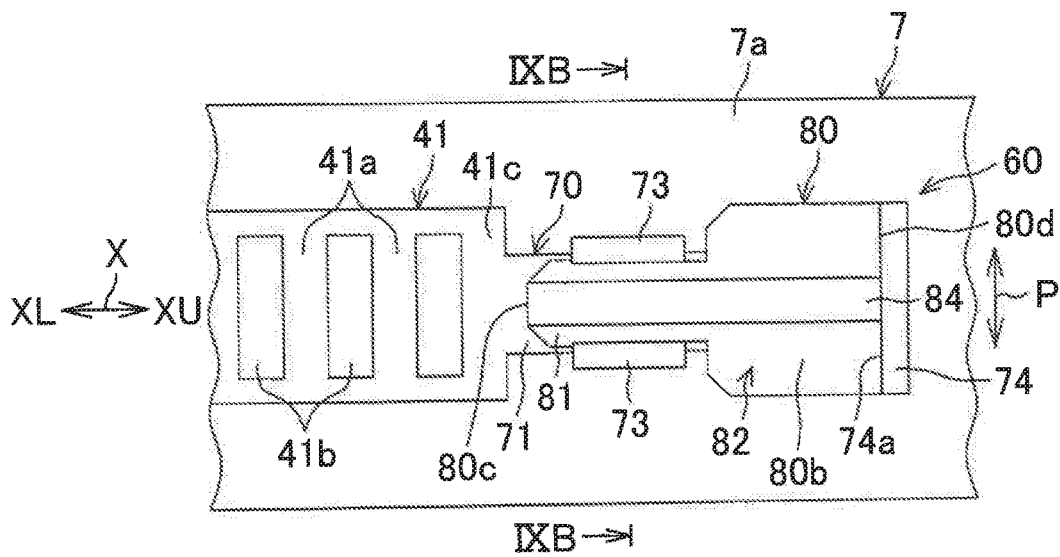
FIG. 9A is a bottom view of the lower limit sliding position restriction mechanism.
Figure 9B:
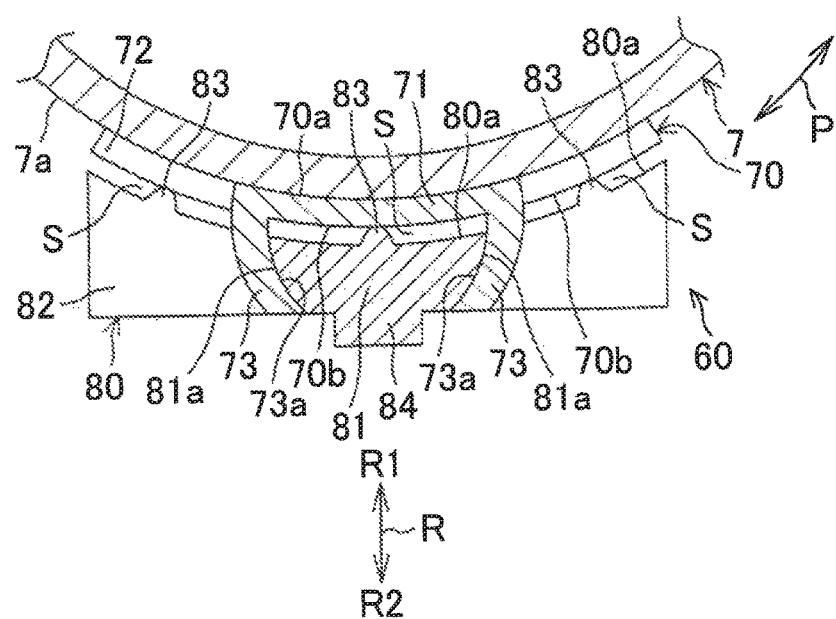
FIG. 9B is a sectional view that is taken along line IXB-IXB in FIG. 9A.

When the upper jacket 7 is displaced to the lower limit sliding position, the buffer member 80 functions as a buffer stopper that restricts the lower limit sliding position while contacting the second tooth 42a of the second tooth member 42 in a contact direction Z1 to buffer a shock. FIG. 7 is an exploded perspective view of the retaining member 70 and the buffer member 80. FIG. 8 is a bottom view of the retaining member 70. FIG. 9A is a bottom view of the lower limit sliding position restriction mechanism 60, and FIG. 9B is a sectional view that is taken along line IXB-IXB in FIG. 9A.

With reference to FIG. 7 and FIG. 8, the retaining member 70 is formed integrally with the first tooth member 41 as a single member. The retaining member 70 extends from an upper end 41c of the first tooth member 41 to the axially upper side XU, the upper end 41c being an end in the axially upper side XU. The first tooth member 41 and the retaining member 70 may be made of sheet metal and may be integrally pressed. The retaining member 70 includes: a first portion 71 that is integrally coupled to the upper end 41c of the first tooth member 41; a second portion 72 that extends from the first portion 71 to the axially upper side XU; paired holding portions 73 that are provided in the first portion 71; and a restriction portion 74 that is provided in the second portion 72.

With regard to width in a circumferential direction P of the upper jacket 7, the width of the second portion 72 in the circumferential direction P is set to be larger than that of the first portion 71. In the circumferential direction P, the second portion 72 protrudes toward both sides of the first portion 71. As shown in FIG. 6, FIG. 7, and FIG. 9A, the retaining member 70 includes: an attached surface 70a that is attached along the outer periphery 7a of the upper jacket 7; and a support surface 70b that is opposite to the attached surface 70a in a radial direction R of the upper jacket 7. The attached surface 70a and the support surface 70b are provided in the first portion 71 and the second portion 72 of the retaining member 70.

The attached surface 70a and the support surface 70b extend in the column axis direction X and the circumferential direction P of the upper jacket 7. The attached surface 70a faces inward in the radial direction R (hereinafter referred to as radial inward R1). The support surface 70b faces outward in the radial direction R (hereinafter referred to as radial outward R2) and supports the buffer member 80 in the radial direction R. The paired holding portions 73 are plate members, each of which extends in the column axis direction X, and extend from the first portion 71 so as to cross the first portion 71.

As shown in FIG. 9B, the paired holding portions 73 are respectively disposed on both sides of the first portion 71 in the circumferential direction P of the upper jacket 7 and hold the buffer member 80 toward the support surface 70b. When seen in the column axis direction X, the paired holding portions 73 each include an inclined surface 73a that faces the support surface 70b. When seen in the column axis direction X, the inclined surface 73a may be a curved surface or a straight surface.

As shown in FIG. 6, the restriction portion 74 is provided at an end 72a in the axially upper side XU of the second portion 72. The restriction portion 74 receives the buffer member 80 in an opposite direction Z2 opposite to the contact direction Z1, so as to restrict movement of the buffer member 80 in the opposite direction Z2. The restriction portion 74 includes an inclined surface 74a that is inclined toward a side toward which the contact direction Z1 is directed as the inclined surface 74a extends in the radial outward R2 of the upper jacket 7. As shown in FIG. 6, FIG. 7, FIG. 9A, and FIG. 9B, the buffer member 80 includes a first portion 81, a second portion 82, a first surface 80a, a second surface 80b, an end 80c on the contact direction Z1-side (i.e., on the side toward which the contact direction Z1 is directed), the other end 80d on the opposite direction Z2-side (i.e., on a side toward which the opposite direction Z2 is directed), protrusions 83, and a rib 84.

The first portion 81 is held toward the support surface 70b by the paired holding portions 73 of the retaining member 70, and is supported in the radial direction R by the first portion 71 of the retaining member 70. The second portion 82 extends toward the axially upper side XU (i.e., the side toward which the opposite direction Z2 is directed, the opposite direction Z2 being opposite to the contact direction Z1) of the first portion 81 and is supported in the radial direction R by the second portion 72 of the retaining member 70. With regard to the width in the circumferential direction P of the upper jacket 7, the width of the second portion 82 in the circumferential direction P is set to be larger than that of the first portion 81. The second portion 82 protrudes toward both sides of the first portion 81 in the circumferential direction P. Protruding portions of the second portion 82, which protrude from the first portion 81, are disposed on the opposite direction Z2-side of the paired holding portions 73 (i.e., on the side of the paired holding portions 73 in the opposite direction Z2). The paired holding portions 73 are respectively engaged with the protruding portions of the second portion 82 in the column axis direction X. Thus, the buffer member 80 is restricted from being separated from the retaining member 70 toward the contact direction Z1-side.

The first surface 80a of the buffer member 80 is a supported surface that faces the support surface 70b of the retaining member 70 and that is supported by the support surface 70b. The first surface 80a (the supported surface) is formed as a curved surface that is curved in the circumferential direction P of the upper jacket 7, and extends in the column axis direction X. The first surface 80a faces the radial inward R1. The second surface 80b is disposed on a side opposite to the first surface 80a in the radial direction R.

As shown in FIG. 7 and FIG. 9B, the first surface 80a is provided with the plurality of protrusions 83 that contact the support surface 70b and form a space S between the support surface 70b and the first surface 80a. One or some of the protrusions 83 may be elongated protrusions, each of which extends across the first portion 81 and the second portion 82 in the column axis direction X, and the rest of the protrusions may be elongated protrusions, each of which is disposed only in the second portion 82 and extends in the column axis direction X.

As shown in FIG. 6 and FIG. 9A, the second surface 80b is provided with the rib 84 that extends in the column axis direction X. The rib 84 extends across the first portion 81 and the second portion 82 in the column axis direction X. The end 80c of the buffer member 80 is located on the contact direction Z1-side of the paired holding portions 73 of the retaining member 70 (i.e., on the side of the paired holding portions 73 in the contact direction Z1), and contacts the second tooth 42a of the second tooth member 42 (the engagement member) at the lower limit sliding position during the telescopic adjustment.

The other end 80d of the buffer member 80 is engaged with the inclined surface 74a of the restriction portion 74 in the retaining member 70. The other end 80d includes an inclined surface that is inclined in a reverse direction as compared to the inclination of the inclined surface 74a, so as to follow the inclined surface 74a (in other words, the other end 80d includes an inclined surface that is inclined toward the side toward which the opposite direction Z2 is directed as the inclined surface extends toward the radial inward R1). As shown in FIG. 7 and FIG. 9B, the first portion 81 of the buffer member 80 includes paired side surfaces 81a that are provided on the opposite sides thereof in the circumferential direction P. As shown in FIG. 9B, each of the paired side surfaces 81a is inclined such that the inclination of the side surface 81a coincides with the inclination of the inclined surface 73a of the corresponding holding portion 73.

When the buffer member 80 is assembled to the retaining member 70 during assembly, the first portion 81 of the buffer member 80 may be pressed toward the radial inward R1, so as to be fitted between the paired holding portions 73 as shown in FIG. 7. Alternatively, in a state where the buffer member 80 is obliquely inclined with respect to the column axis direction X, the first portion 81 may be inserted between the paired holding portions 73 toward the axially lower side XL.

According to this embodiment, as shown in FIG. 9B, the paired holding portions 73 of the retaining member 70 hold the buffer member 80 toward the support surface 70b of the retaining member 70. Thus, as shown in FIG. 6, when the buffer member 80 contacts the second tooth member 42 as the engagement member during the telescopic adjustment, the buffer member 80 is unlikely to be detached from the retaining member 70 and thus can stably absorb the shock at the lime of contact.

In addition, when the buffer member 80 contacts the second tooth member 42, separation of the buffer member 80 from the support surface 70b (separation to the radial outward R2) is suppressed by the inclined surface 74a of the restriction portion 74 in the retaining member 70. Thus, the buffer member 80 is further unlikely to be detached from the retaining member 70. As shown in FIG. 9B, the protrusions 83, each of which is formed on the first surface 80a as the supported surface, form the space S between the first surface 80a and the support surface 70b. Thus, as shown in FIG. 6, when the buffer member 80 contacts the second tooth member 42 during the telescopic adjustment, along with compressed deformation of the buffer member 80 in the column axis direction X, the first surface 80a of the buffer member 80 is deformed and expanded such that a portion thereof is protruded in the space S on the side of the support surface 70b. Thus, the deformation of the buffer member 80 in a direction in which the buffer member 80 separates (moves away) from the support surface 70b is suppressed. Thus, the buffer member 80 is further unlikely to be detached from the retaining member 70.

Furthermore, the rib 84 that extends in the column axis direction X is formed on the second surface 80b of the buffer member 80, and the buffer member 80 thereby has high rigidity against bending toward the second surface 80b-side (indicated by a blank arrow in FIG. 6). Accordingly, when the buffer member 80 contacts the second tooth member 42 and is compressed in the column axis direction X during the telescopic adjustment, the bending deformation of the buffer member 80 toward the second surface 80b-side is suppressed. Thus, the buffer member 80 is further unlikely to be detached from the retaining member 70.

Moreover, as shown in FIG. 6, when the buffer member 80 contacts the second tooth member 42 during the telescopic adjustment, the cam member 47 that is supported by the lower jacket 8 is disposed on the opposite side of the buffer member 80 from the support surface 70b of the retaining member 70, and the cam member 47 functions as a restriction member that restricts the separation of the buffer member 80 from the support surface 70b. Thus, the buffer member 80 is further unlikely to be detached from the retaining member 70.

The disclosure is not limited to the embodiment. For example, the retaining member 70 may be provided as a separate component from the first tooth member 41 and may be fixed to the upper jacket 7. In addition, the retaining member 70 may be formed integrally with the upper jacket 7 by using a single material. Furthermore, the tooth lock mechanism 40 may not be provided. As the engagement member, a shaft member, such as a bolt that is fixed to the lower jacket 8, may be used.

Instead of the cam member 47, a shaft member or a tubular member that is supported by the lower jacket 8 may be used as the restriction member. Various modifications can be made to the embodiment within the scope of the disclosure.

What is claimed is:

1. A steering system comprising:
   a column jacket that includes a lower jacket, and an upper jacket having a tubular shape, the upper jacket being fitted into the lower jacket so as to be slidable with respect to the lower jacket in a column axis direction within a specified sliding range during telescopic adjustment, and the upper jacket moving integrally with a steering member in the column axis direction;
   an engagement member that is supported by the lower jacket;
   a retaining member that is fixed to an outer periphery of the upper jacket and moves integrally with the upper jacket during the telescopic adjustment; and a buffer member that is retained by the retaining member so as to face the engagement member in the column axis direction and contacts the engagement member in a contact direction at a time when the upper jacket is displaced to one sliding end of the specified sliding range, the contact direction extending along the column axis direction, wherein the retaining member includes a support surface that extends in the column axis direction, faces outward in a radial direction of the upper jacket, and supports the buffer member in the radial direction; paired holding portions that are respectively disposed on both sides of the buffer member in a circumferential direction of the upper jacket and hold the buffer member toward the support surface; and a restriction portion configured to be engaged with an end of the buffer member on a side toward which an opposite direction is directed, so as to restrict movement of the buffer member in the opposite direction, the opposite direction being opposite to the contact direction.

2. The steering system according to claim 1, wherein the restriction portion includes an inclined surface that is inclined toward a side toward which the contact direction is directed as the inclined surface extends outward in the radial direction.

3. The steering system according to claim 1, wherein:
the buffer member includes a supported surface that is supported by the support surface; and
the supported surface includes a protrusion that contacts the support surface and forms a space between the supported surface and the support surface.

4. The steering system according to claim 1, wherein the buffer member includes a first surface that is a supported surface supported by the support surface, a second surface that is disposed on a side opposite to the first surface in the radial direction, and a rib that is formed on the second surface and extends in the column axis direction.

5. The steering system according to claim 1, wherein:
the steering system includes a restriction member that is supported by the lower jacket; and
when the buffer member contacts the engagement member, the restriction member is disposed on an opposite side of the buffer member from the support surface so as to restrict separation of the buffer member from the support surface.

* * * * *